UNITED STATES PATENT OFFICE.

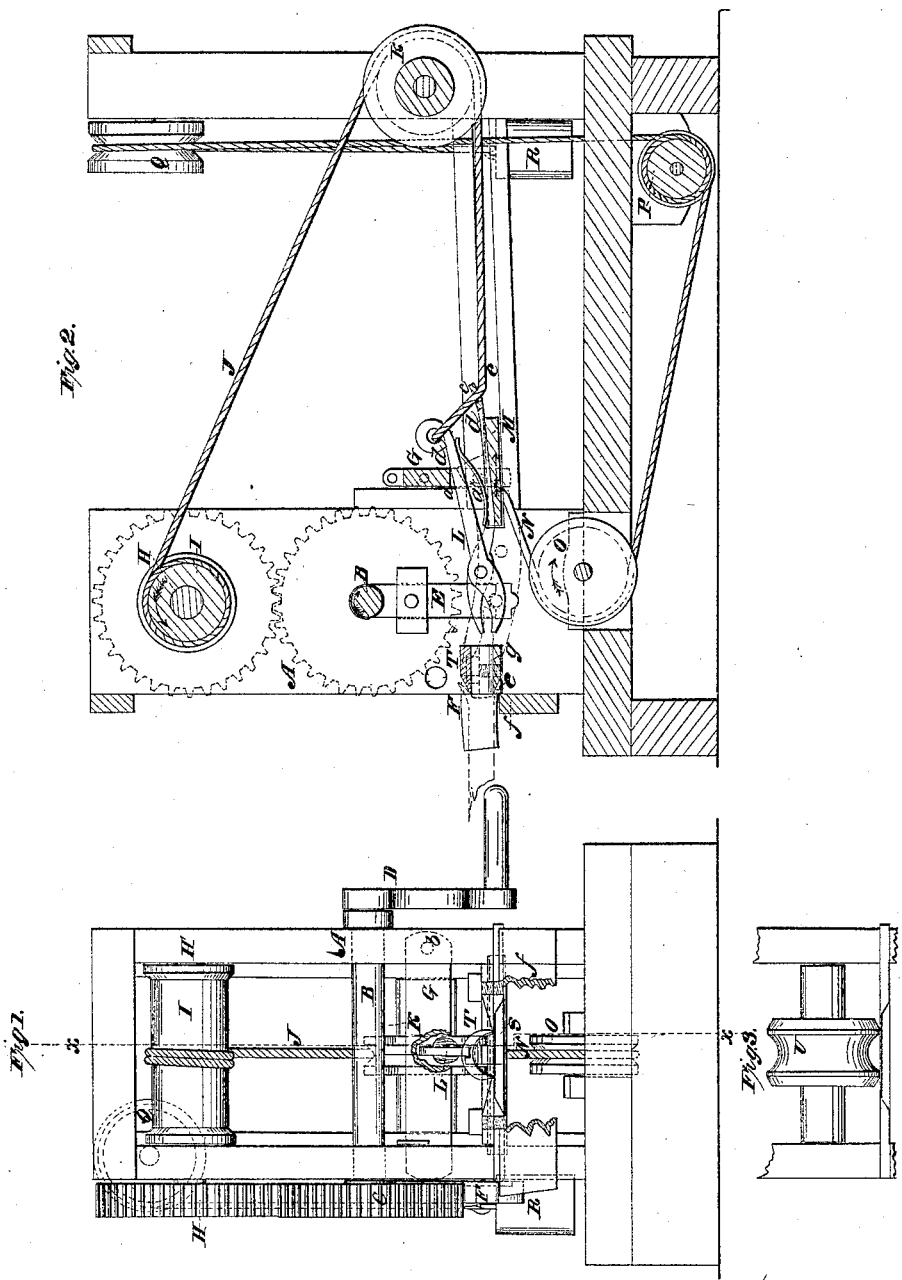

SAMUEL WAGNER, OF MONROE, WISCONSIN.

IMPROVEMENT IN MACHINES FOR SHAVING HOOPS FOR CASKS.

Specification forming part of Letters Patent No. 44,567, dated October 4, 1864.

*To all whom it may concern:*

Be it known that I, SAMUEL WAGNER, of Monroe, in the county of Green and State of Wisconsin, have invented a new and useful Machine for Shaving Poles or Timber for Cask-Hoops; and I do hereby declare that the following is a full, clear, and exact description of the same, reference being had to the accompanying drawings, making a part of this specification, in which—

Figure 1 is an end view of my invention; Fig. 2, a side sectional view of the same taken in the line $xx$, Fig. 1; Fig. 3, a detached view of a roller pertaining to the same.

Similar letters of reference indicate corresponding parts in the several figures.

This invention relates to a new and useful machine for shaving poles or timber for cask-hoops, either split poles or pieces cut from a log.

The invention consists in the employment or use of two stationary knives or cutters in connection with a pair of tongs, all arranged to operate in the manner hereinafter set forth.

To enable those skilled in the art to fully understand and construct my invention, I will proceed to describe it.

A represents a framing, in which a shaft, B, is placed horizontally, having a toothed wheel, C, at one end and a crank, D, or a pulley at its opposite end, for the purpose of turning it. The journal of the shaft B near the wheel C is fitted in a vertically-sliding bearing, E, the lower end of which is connected to a lever, F, the back end of the latter being connected by a link, $a$, with one end of a bar, G, the opposite end of which is attached to the framing A by means of a pivot, $b$. In the upper part of the framing A there is a shaft, H', having a toothed wheel, H, at one end of it and a drum, I, keyed on it and extending nearly its whole length. To the drum I there is attached a rope, J, which passes around a pulley, K, at the rear part of the framing A, and is connected at its end to a pair of tongs, L, said rope passing through an eye, $c$, at the outer part of one of the shanks, $d$, of the tongs, and secured to the end of the other shank, $d'$, as shown clearly in Fig. 2. A spring, $a$, between the two shanks has a tendency to keep the same, as well as the jaws of the tongs, distended. The shank $d$ of the tongs L is riveted to a slide, M, which is fitted and works in horizontal grooves $e\ e$ at the lower part of the framing, and to the bottom of this slide a rope, N, is attached, which passes around a pulley, O, in the front part of the framing and extends back to the rear of the framing and around a pulley, P, and then extends upward and passes over a pulley, Q, and has a weight, R, at its end.

S represents a straight cutter, which is secured horizontally, or nearly so, to the front part of the framing A, and has its bevel $e$ at its under side, as shown in Fig. 2. The cutting-edge of this cutter S is just above the upper edge of a cross-bar, $f$, at the front part of the framing. Directly above the cutter S there is a semicircular cutter, T. (Shown in Fig. 1.) This cutter T is made of a size corresponding to the desired dimensions of a transverse section of the hoops to be shaved.

The operation is as follows: When the device is not in use, the front end of the lever F is off from one end of the bar $f$, which serves as a support for it, and the wheel C is out of gear with wheel H, and the weight R keeps the tongs L directly behind the cutters S T. The "stuff" to be operated upon, having been previously gotten out of proper dimensions, is shoved between the two cutters S T, one stick at a time, and fitted between the jaws of the tongs L. The front end of the lever F is then raised and placed on the end of the bar $f$, and the wheel C thereby thrown in gear with the wheel H, and in raising the front end of the lever F the bar G, which is connected with the back end of F, is pressed down on the shank $d'$ and the jaws of the tongs clasp the end of the stick, which is shown in red. (See more particularly Fig. 2.) Motion is then given the shaft H' by any convenient power, and the rope J draws back the tongs L, and the latter, under the pull of the rope, draws the stick between the cutters S T, the former shaving the lower surface of the stick to form a plane, and the latter giving a half-round or semicircular form to the upper surface of the stick. When the latter is fully drawn through between the cutters, the attendant throws the front end of the lever F off from the bar $f$ and the wheel C drops out of gear with H, and the weight R throws the tongs L back to its original position behind the cutters S T, ready to receive a succeeding stick to be operated upon as before.

When it is desired to operate upon sticks made from split poles, in which the half-round or semi-cylindrical front is already formed by the natural growth of the wood, the semicircular cutter T is dispensed with, and a roller, U, provided with a concave periphery, substituted for it. (See Fig. 3.) The lower cutter, S, in this case simply shaves the lower or split surface of the stick.

Having thus described my invention, what I claim as new, and desire to secure by Letters Patent, is—

The tongs L, arranged to be operated by a weight, gearing, and drum, substantially as shown, in combination with a cutter, S, and a semicircular cutter, T, substantially as and for the purpose set forth.

SAMUEL WAGNER.

Witnesses:
S. P. ROTE,
DAVID PHILLIPS.